UNITED STATES PATENT OFFICE.

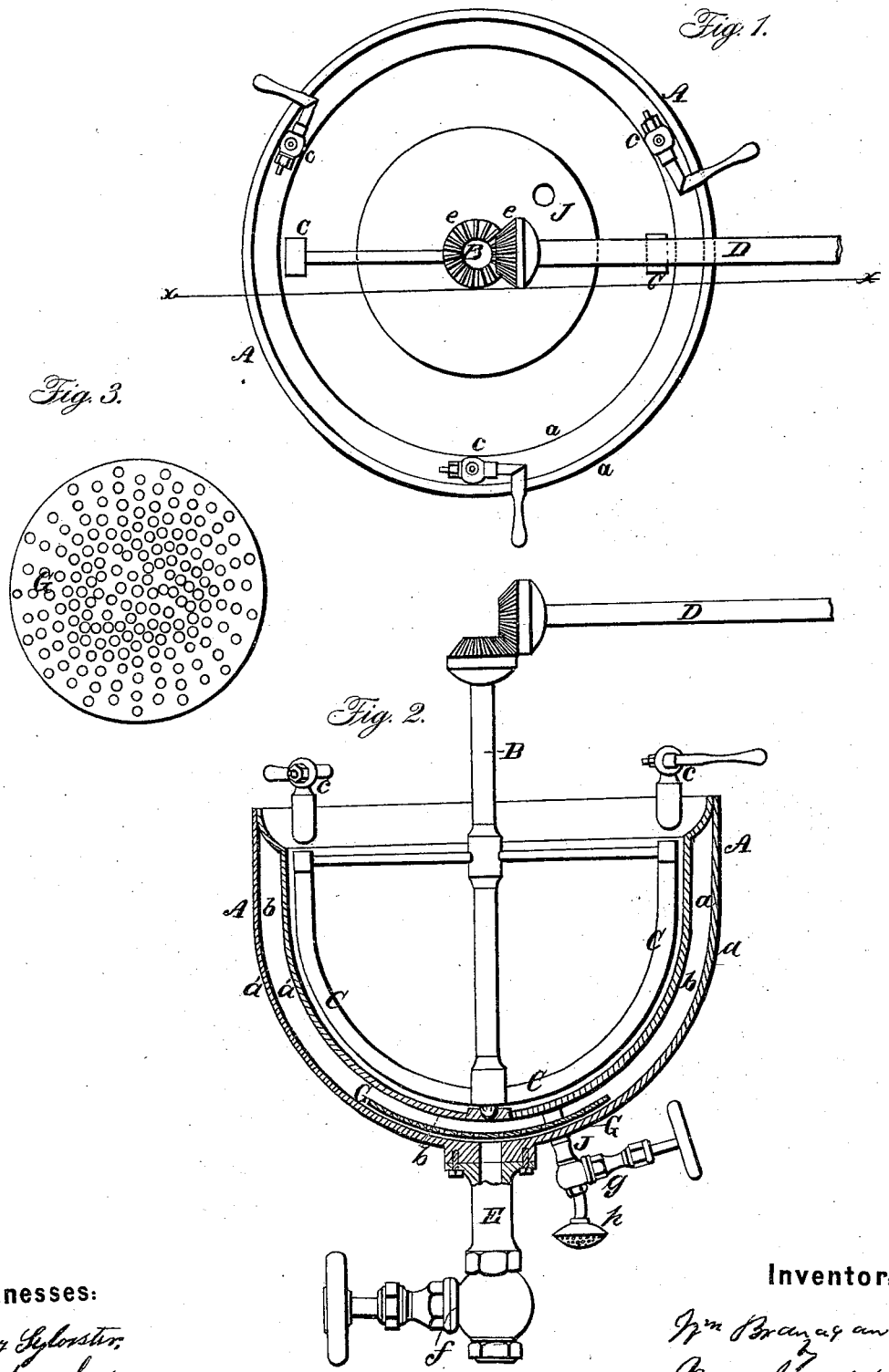

WILLIAM BRANAGAN, OF BURLINGTON, IOWA.

IMPROVED LARD-BOILER.

Specification forming part of Letters Patent No. 59,350, dated November 6, 1866.

*To all whom it may concern:*

Be it known that I, WILLIAM BRANAGAN, of Burlington, in the county of Des Moines and State of Iowa, have invented a new and Improved Lard-Rendering Boiler; and I do hereby declare that the following is a full, clear, and exact description thereof, reference being had to the accompanying drawings, making a part of this specification, in which—

Figure 1 is a top view of the boiler. Fig. 2 is a section through the same, taken in the vertical plane indicated by red line $x\,x$, Fig. 1. Fig. 3 is a view of the perforated steam-distributer.

Similar letters of reference indicate corresponding parts in the several figures.

This invention relates to an improved boiler which is designed for the use of steam in the process of rendering lard.

The nature of my invention consists in combining with a double-wall kettle, between the walls of which steam is admitted, a perforated distributing-plate for more thoroughly distributing the steam to the bottom of the kettle containing the fat; also, in employing means for stirring the lard to prevent it from burning, and for straining the lard on its escape from the kettle or boiler, as will be hereinafter described.

To enable others skilled in the art to understand my invention, I will describe its construction and operation.

The kettle or boiler A is of a hemispherical shape, and constructed of two walls, $a\,a$, so as to leave a steam-space, $b$, between them, as shown in Fig. 2. These two walls $a\,a$ are united at the upper edge or rim of the boiler, at which point several air-cocks, $c\,c$, are applied for allowing air to escape from the space $b$.

A spindle, B, is erected in the center of this boiler, carrying a semicircular blade, C, which revolves close to the surface of the inner wall, $a$, and serves as a stirrer for preventing the lard from burning during the process of trying. This spindle receives a rotary motion from a horizontal driving-shaft, D, by means of the two bevel spur-wheels $e\,e$.

Steam is admitted between the walls of the boiler through a pipe, E, which is provided with a cut-off cock, $f$, and which directs the steam upon the lowest point of the inner wall, $a$. To prevent this lowest part of the inner wall from becoming too highly heated, and to obtain an equal and uniform distribution of the steam or heat upon this inner wall, I introduce between the two walls $a\,a$, over the steam-pipe, a perforated plate, G, which has the effect of spreading the inflowing steam and causing it to pass outward as well as upward, thus effecting the desired object of uniformly heating the lard in the boiler.

The lard is drawn from the bottom of the boiler through a pipe, J, which has a stop-cock, $g$, applied to it, and also a rose-nozzle, $h$, for straining the lard as it flows from the boiler.

Having thus described my invention, what I claim as new, and desire to secure by Letters Patent, is—

1. The employment of a perforated distributing-plate or its equivalent between the walls of a double wall lard-boiler, in combination with the steam-inlet pipe, substantially as and for the purposes described.

2. Providing a double-wall lard-rendering kettle, A, with stirrer, air-cocks, and an outlet-pipe having a strainer, $h$, applied to it, substantially as described.

WM. BRANAGAN.

Witnesses:
CHAS. SOWDEN,
WILLIAM J. POLLOCK.